May 30, 1967  F. MITCHELL  3,322,157
CEMENT-LINED PIPES OF INCREASED FLEXIBILITY
AND METHOD OF MAKING SAME
Filed Aug. 19, 1963

FARRIS MITCHELL INVENTOR.

BY *William D. Jackson*

ATTORNEY

United States Patent Office 3,322,157
Patented May 30, 1967

3,322,157
CEMENT-LINED PIPES OF INCREASED FLEXI-
BILITY AND METHOD OF MAKING SAME
Farris Mitchell, Dallas, Tex., assignor to Mobil Oil
Corporation, a corporation of New York
Filed Aug. 19, 1963, Ser. No. 302,890
11 Claims. (Cl. 138—172)

This invention involves internally lined tubular members, and more particularly cement-lined pipes, of increased flexibility.

It has been a conventional practice to provide tubular members with internal linings in order to protect the inner surfaces thereof. These protective linings are frequently formed of a relatively brittle material, i.e., a material having low tensile strength as compared with its compressive strength and as compared with the tensile strength of the tubular member itself. For example, it is common to line steel pipes with hydraulic cement in order to increase their resistance to corrosive fluids. Such cement-lined pipes have found particular application in the petroleum industry for the handling of corrosive fluids such as oil field brines. While cement linings have afforded a measure of protection against corrosive fluids, such installations have often failed due to cracks occurring in the lining as a result of tensile stresses applied in the cement due to flexing or bending of the pipe during handling. This, of course, has severely limited the application of cement-lined pipes and has required that they be handled with the greatest care.

In accordance with one aspect of the instant invention there are provided internally lined tubular members, such as cement-lined pipes, which will withstand significant flexing without failure of the internal lining.

In accordance with another aspect of the invention there is provided a new and improved method of making such internally lined tubular members.

In carrying out a preferred embodiment of the method of the invention, the interior of a tubular member is lined with a normally brittle material, e.g., cement, in a plastic condition. Thereafter, and while the material is in a plastic condition, transverse tensile forces are applied to the tubular member in order to cause elastic enlargement thereof. These forces are maintained until the material has developed sufficient set strength to render it essentially nondeformable. Thereafter, these forces are removed and the elastic-restoring forces of the tubular member place the brittle lining in compression.

A more detailed description now will be given with reference to the drawing in which.

The invention now will be described with respect to its application in lining cylindrical pipes with a brittle material such as cement. It will be understood, however, that the invention is applicable to the protective lining of other tubular members, such as elongated containers, and that such tubular members may have polygonal cross sections or curvilinear cross sections other than circular.

As is well recognized by those skilled in the art, cement has a relatively high compressive strength but a very low tensile strength. For example, a cement having a compressive strength of about 7,000 p.s.i. (pounds per square inch) will fail in tension at about 600 p.s.i. In accordance with the present invention, the cement lining of a pipe is placed under a fixed compressive stress in order to allow it to accommodate forces which would otherwise cause it to fail in tension. This is accomplished by elastically enlarging the pipe, i.e., enlarging the pipe through the action of an applied agency such that when the agency is removed the pipe will contract, before the cement has set. After the cement has set, the pipe is allowed to contract, placing the cement lining under a circumferential compressive stress and an attending longitudinal compressive stress.

Figure 1:
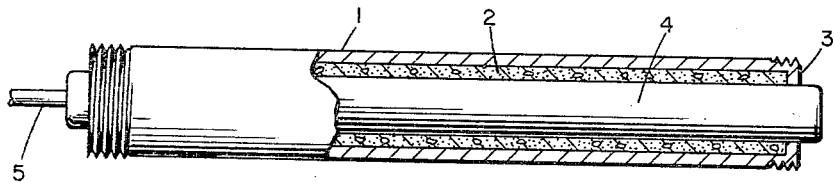
FIGURE 1 is an illustration, partly in section, of one mode of carrying out the instant invention.

More particularly, and as illustrated in FIGURE 1, a cement lining 2 is applied in a conventional manner such as by centrifugal casting to a steel pipe 1 having annular shoulders such as is indicated by the numeral 3 at the ends thereof. After the lining is applied but before it is set, an expansible sleeve 4 is inserted into the pipe. The sleeve includes a conduit 5 through which hydraulic pressure is applied to the interior of the sleeve.

After the expansible sleeve has been positioned as shown in FIGURE 1, hydraulic pressure is applied through the conduit 5 to produce transverse tensile stresses in the pipe and cause elastic enlargement thereof. This pressure is maintained until the cement has set sufficiently to render it essentially nondeformable, i.e., not subject to plastic deformation, as contrasted with elastic deformation, at the stress produced by the contracted pipe. Thereafter, the pressure is released and the sleeve is withdrawn from the pipe. As the pressure is released, the elastic-restoring forces in the pipe will cause it to contract, thus placing the cement lining under a circumferential compressive stress and an attending longitudinal compressive stress.

The annular shoulders 3 at the ends of the pipe prevent longitudinal displacement of the cement lining relative to the pipe, both during the time that pressure is applied and after the cement has set and the sleeve withdrawn. However, these shoulders may be dispensed with and the frictional bonding force between the pipe and cement relied upon to prevent longitudinal displacement of the lining relative to the pipe.

Figure 2:
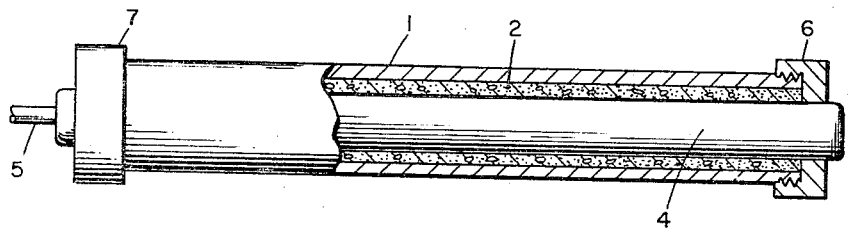
FIGURE 2 is an illustration, partly in section, of a modified form of the invention.

The application of the instant invention to a pipe lacking such annular shoulders is illustrated in FIGURE 2 in which like elements are designated by the reference numerals used in FIGURE 1. In FIGURE 2 the cement lining and the expansible sleeve are shown in position within pipe 1. Since the pipe lacks shoulders such as those shown in FIGURE 1, a pair of annular caps 6 and 7 are threadedly connected to the ends of the pipe. These caps function to prevent longitudinal displacement of the cement relative to the pipe during the time pressure is applied in the expansible sleeve. When the pressure is released and the sleeve and caps 6 and 7 are removed, the cement lining 2 is placed in fixed circumferential and longitudinal compressive stress as in the embodiment of FIGURE 1. In this case, the frictional bond between the pipe and cement is relied upon to prevent longitudinal displacement of the lining relative to the pipe.

In the embodiments of FIGURES 1 and 2 the pipe is enlarged only in the radial direction. In a preferred form of the invention, the pipe is enlarged elastically in a longitudinal as well as radial direction, thus increasing the resultant longitudinal stress in the lining. This form of the invention is illustrated in FIGURE 3 in which like elements are designated by the reference numerals of FIGURES 1 and 2.

Figure 3:
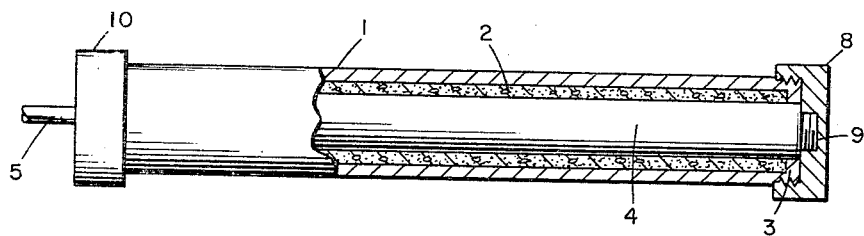
FIGURE 3 is an illustration, partly in section, of a further modification of the invention.

As shown in FIGURE 3, the expansible sleeve is provided with a pair of caps 8 and 10 which are secured thereto by threaded connections such as that indicated by the reference numeral 9. In carrying out this form of the invention, cap 8 is removed and the sleeve is inserted within the pipe and the cap 10 threadedly connected to one end thereof. Cap 8 then is threadedly connected to the sleeve and to the other end of the pipe. When pressure is applied to the sleeve, the pipe is elastically enlarged longitudinally as well as radially because of the force against the inner walls of the caps which is transferred to the pipe through the threaded connections. When the pressure is released, the elastic-restoring forces in the pipe will cause it to contract both longitudinally and transversely, thus placing the cement lining under a greater longitudinal compressive stress than that obtained by the embodiments of FIGURES 1 and 2. As in the embodiment of FIGURE 2, the annular shoulders 3 may be dispensed with and the frictional bond between the pipe and cement relied upon to prevent displacement of the lining relative to the pipe after the cement has set.

In order to aid those skilled in the art in the practice of the invention, the following specific example is given of the application of a ½-inch cement lining to an API grade N–80 4-inch tubing having a wall thickness of 0.226 inch.

The tubing is lined with API class A cement having a slurry density of 17.0 pounds per gallon and a water content of 34.6 weight percent based on the weight of the dry cement. While the cement is in a plastic or unset condition, the expansible sleeve is inserted and pressured up to 4700 p.s.i. The cement then is cured for about 24 hours at a temperature in the range of 140°–180° F. to give a set compressive strength of about 7900 p.s.i. Thereafter, the pressure in the sleeve is released. As the pipe contracts, it places the lining under a circumferential compressive stress and a longitudinal compressive stress. The circumferential stress and strain produced in the cement lining are approximately 3600 p.s.i. and .0012 inch per inch, respectively.

The sleeve pressure to be applied in carrying out the invention will vary depending upon the size and strength of the tubular member, the size and strength of the lining, and the degree of compressive stress desired in the lining. Obviously, the pressure should be less than that which will strain the tubular member beyond the point at which it will contract elastically and less than that which will produce a compressive stress in the cement greater than the compressive strength thereof. On the other hand, the pressure applied in the sleeve should be sufficient to enlarge elastically the tubular member such that appreciable compressive stress will be produced in the lining when the tubular member contracts. In general, the final circumferential compressive stress and strain produced in the lining should be at least 300 p.s.i. and .0001 inch per inch, respectively, in order to obtain the advantages of the instant invention and impart significant increased flexibility to the cement-lined member. For cement-lined pipes to be used in oil-field operations, this stress and strain preferably will be at least 2400 p.s.i. and .0008 inch per inch, respectively. The initial strain in the pipe and the corresponding pressure in the sleeve necessary to produce the above stresses and strains will depend, of course, upon the particular application of the invention. For the pipe and lining set forth in the above example, a sleeve pressure of approximately 400 p.s.i. will result in a circumferential strain in the lining of .0001 inch per inch and a stress of 300 p.s.i.

Having described certain specific embodiments of the invention, it is understood that further modifications may be suggested to those skilled in the art, and it is intended to cover all such modifications as fall within the scope of the appended claims.

I claim:
1. A method of providing a tubular member having a continuous interior wall with a liner of a normally brittle material, comprising the steps of:
    (a) lining the interior wall of said tubular member with said normally brittle material in a plastic condition,
    (b) applying transverse tensile forces to said tubular member whereby it is enlarged elastically,
    (c) maintaining said transverse tensile forces until said material has set sufficiently to render it essentially nondeformable, and
    (d) thereafter removing said transverse tensile forces whereby the elastic restoring force of said tubular member places said brittle material in compression.

2. A method of providing a tubular member having a continuous interior wall with a liner of a normally brittle material, comprising the steps of:
    (a) lining the interior wall of said tubular member with said normally brittle material in a plastic condition,
    (b) applying longitudinal tensile forces to said tubular member whereby it is elongated elastically,
    (c) maintaining said longitudinal tensile forces until said material has set sufficiently to render it essentially nondeformable, and
    (d) thereafter removing said longitudinal tensile forces whereby the elastic restoring force of said tubular member places said brittle material in compression.

3. A method of providing a tubular member having a continuous interior wall with a liner of a normally brittle material, comprising the steps of:
    (a) lining the interior wall of said tubular member with said normally brittle material in a plastic condition,
    (b) producing transverse and longitudinal tensile stresses in said tubular member whereby it is enlarged elastically,
    (c) maintaining said transverse and longitudinal tensile stresses in said tubular member until said brittle material has set sufficiently to render it essentially nondeformable, and
    (d) thereafter reducing the transverse and longitudinal tensile stresses in said tubular member whereby the elastic restoring force of said tubular member places said brittle material in compression.

4. A method of providing a tubular member having a continuous interior wall with a liner of a normally brittle material comprising the steps of:
    (a) lining the interior wall of said tubular member with said brittle material in a plastic condition,
    (b) thereafter and while said material is in a plastic condition inserting an expansible sleeve in the interior of said tubular member and applying sufficient pressure inside said sleeve to cause elastic enlargement of said tubular member,
    (c) maintaining said pressure until said material has set sufficiently to render it essentially nondeformable, and
    (d) thereafter releasing said pressure whereby the elastic restoring force of said tubular member places said material in compression.

5. A method of providing a tubular member having a continuous interior wall with a liner of hydraulic cement, comprising the steps of:
    (a) lining the interior wall of said tubular member with said hydraulic cement in a plastic condition,
    (b) thereafter applying sufficient pressure against the interior of said tubular member to cause elastic enlargement thereof,
    (c) maintaining said pressure until said cement has set sufficiently to render it essentially nondeformable, and
    (d) thereafter releasing said pressure whereby the elastic restoring force of said tubular member places said cement in compression.

6. A method of providing a metal pipe having a continuous interior wall with a liner of hydraulic cement, comprising the steps of:
    (a) lining the interior wall of said pipe with said hydraulic cement in a plastic condition,
    (b) thereafter and while said cement is in a plastic condition inserting an expansible sleeve having closed ends in the interior of said pipe and connecting the ends of said sleeve to said pipe at longitudinally spaced positions thereof,
    (c) thereafter applying sufficient pressure inside said sleeve to cause transverse and longitudinal elastic enlargement of said pipe, (d) maintaining said pressure until said cement has set sufficiently to render it essentially nondeformable, and (e) thereafter releasing said pressure whereby the elastic restoring force of said pipe places said cement in compression.

7. A method of providing a metal pipe having a continuous interior wall with a liner of hydraulic cement, comprising the steps of:

(a) lining the interior wall of said pipe with said hydraulic cement in a plastic condition, (b) transversely, elastically enlarging said pipe by an amount sufficient to produce a final transverse compressive stress in said cement of at least 300 p.s.i., (c) maintaining said transverse enlargement of said pipe until said cement has set sufficiently to render it essentially nondeformable, and (d) thereafter allowing said pipe to contract whereby said cement is placed under said final transverse compressive stress of at least 300 p.s.i.

8. The method of claim 7 wherein said enlargement of said pipe is by an amount sufficient to produce a final transverse compressive stress of a least 2400 p.s.i.

9. A corrosion-resistant conduit, comprising an elongated metal pipe having a continuous interior wall and transversely stressed in tension, and a hydraulic-cement lining disposed adjacent the inner wall of said pipe and placed under a transverse compressive stress of at least 300 p.s.i. by the elastic restoring force of said pipe.

10. The conduit of claim 9 wherein the transverse compressive stress in said lining is at least 2400 p.s.i.

11. In an article of manufacture, a tubular member having a continuous interior wall and transversely and longitudinally stressed in tension, and a lining of brittle material disposed adjacent the inner wall of said tubular member and transversely and longitudinally stressed in compression by the elastic restoring force of said tubular member.

References Cited
UNITED STATES PATENTS

| | | | |
|---|---|---|---|
| 1,965,748 | 7/1934 | Mitchell | 264—228 X |
| 2,153,741 | 4/1939 | Cobi | 52—223 X |
| 2,164,625 | 7/1939 | Prosser et al. | 138—176 |
| 2,470,009 | 5/1949 | Wilhelm | 138—176 X |
| 2,474,660 | 6/1949 | Fitzpatrick | 264—228 X |
| 3,249,665 | 5/1966 | Bearden et al. | 264—94 |

LAVERNE D. GEIGER, *Primary Examiner.*

T. L. MOORHEAD, *Assistant Examiner.*